United States Patent [19]

Wakura

[11] Patent Number: 5,063,380
[45] Date of Patent: Nov. 5, 1991

[54] DISCRETE OBJECT SEARCHING APPARATUS FOR SEARCH OF DISCRETE FILES AND THE LIKE

[75] Inventor: Shinji Wakura, Osaka, Japan

[73] Assignee: Kabushiki Kaisha Asahi Denshi Kenkyujyo, Osaka, Japan

[21] Appl. No.: 593,501

[22] Filed: Oct. 4, 1990

Related U.S. Application Data

[63] Continuation of Ser. No. 314,129, Feb. 23, 1989, abandoned.

[30] Foreign Application Priority Data

Feb. 24, 1988 [JP] Japan .................................. 63-42828

[51] Int. Cl.⁵ .............................................. H04Q 7/00
[52] U.S. Cl. ................................ 340/825.54; 250/200; 455/603
[58] Field of Search ................... 340/825.35, 825.36, 340/825.39, 825.4, 825.49, 825.54, 505, 568, 571, 572, 825.14; 250/200, 201, 214 B; 455/603, 619; 380/10

[56] References Cited

U.S. PATENT DOCUMENTS

| | | | |
|---|---|---|---|
| 3,906,232 | 9/1975 | Meihofer | 250/214 B X |
| 3,937,949 | 2/1976 | Ishikawa et al. | 455/603 |
| 4,115,006 | 9/1978 | Reymond et al. | 250/214 B X |
| 4,276,472 | 6/1981 | Costantino et al. | 250/214 B |
| 4,392,132 | 6/1983 | Derks | 340/825.14 |
| 4,476,469 | 10/1984 | Lander | 340/825.49 |
| 4,814,742 | 3/1989 | Morita et al. | 349/825.49 |

FOREIGN PATENT DOCUMENTS

| | | | |
|---|---|---|---|
| 0133153 | 10/1980 | Japan | 455/603 |
| 0113642 | 7/1982 | Japan | 455/603 |
| 0004239 | 1/1984 | Japan | 455/603 |
| 63-9592 | 1/1988 | Japan . | |
| 0245095 | 10/1988 | Japan | 455/603 |
| 8804868 | 6/1988 | World Int. Prop. O. | 455/603 |

Primary Examiner—Ulysses Weldon

[57] ABSTRACT

An apparatus is disclosed which enables efficient search of a particular file out of a multiplicity of files arranged on shelves, such that a display light, such as light-emitting diode, lights to externally indicate the location of the file only when a signal receiver attached to the file receives a predetermined signal from a signal transmitter connected to a computer. More particularly, a discrete object searching apparatus is provided for searching and locating discrete files wherein the signal transmitter and the signal receiver are, respectively, an infrared signal transmitter and an infrared signal receiver. An optical receptor portion of the receiver is provided with a means for cutting off visible light to eliminate wasteful use of the battery of the receiver. The receiver has no amplifier portion, the receptor portion being thus directly connected to a data processing portion in the receiver. The apparatus can perform not only search of a discrete file, but also search of a group of files. Further, the apparatus permits two-way communication so that the location of the file can be displayed on the display screen of the computer, whcih facilitates easy management of file inventory.

15 Claims, 6 Drawing Sheets

DISCRETE OBJECT SEARCHING APPARATUS FOR SEARCH OF DISCRETE FILES AND THE LIKE

This application is a continuation of application Ser. No. 07/314,129 filed on Feb. 23, 1989, now abandoned.

FIELD OF THE INVENTION

This invention relates to a discrete object searching apparatus for search of discrete files and, more particularly, to a discrete object searching apparatus of the type which is employed in, for example, locating and picking out a desired file from among a multiplicity of files.

BACKGROUND OF THE INVENTION

Generally, objects for search, such as files, are classified and stored according to kinds of the objects, if they are large in number, and the operation of searching a desired one out of the objects is manually performed.

In hospitals, for example, objects for search, e.g., files in which individual charts for patients are kept are classified and arranged on shelves in alphabetical or the like order, and operations of taking out charts from the shelves and returning them to their original locations on the shelves are usually carried out by manual work.

Figure 7:
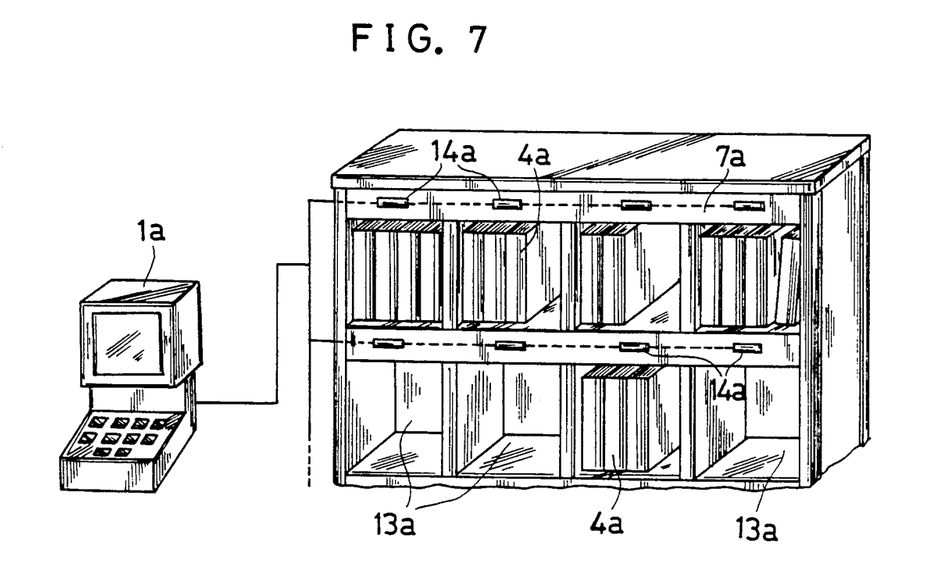
FIG. 7 is a perspective view of a conventional medical-chart searching apparatus.

Hitherto, there have been known location search apparatuses for search of medical chart locations of the type designed to enable more rapid and more accurate performance of such manual chart take-out operation, such that, as FIG. 7 illustrates by way of example, compartments 13a on a shelf 7a for accommodation of charts 4a therein are individually equipped with lamp indicators 14a so that only the lamp of a particular compartment 13a in which the chart 4a desired to be taken out is kept can be lit.

The use of such location search apparatus permits easy finding of the particular compartment 13a in which the desired chart is kept, it being thus possible to know the location of the chart 4a by the block or class to which the chart 4a belongs. Such location search apparatus for search of files and the like is disclosed in, for example, Japanese Patent Laid-Open Pblication No. 63-9592.

In practice, however, the foregoing location search apparatus has involved various problems as follows:

(1) While the location of each block of charts stored can easily be spotted because each compartment 13a is equipped with a lamp indicator 14a, manual operation is required to locate any particular chart 4a from among the block of charts, which is very troublesome and time-consuming.

(2) Since the location for each individual chart 4a is designated by a particular compartment 13a therefor, care must be used to ensure that the chart 4a, if taken out from the compartment 13a, be returned to its original location, i.e., same compartment 13a on same shelf 7a, when it is to be shelved again; as such, the operation of returning the chart 4a to its original location is very troublesome unless individual blocks of charts are clearly defined under clearcut classifications.

(3) Therefore, where the total number of charts 4a is large, the charts 4a accommodated in each individual compartment 13a are naturally large in number, which makes chart taking-out/taking-in operations troublesome all the more.

(4) Furthermore, such known location-search apparatus has a fatal difficulty that if a chart 4a is erroneously placed in a wrong compartment 13a instead of being returned to a specified compartment 13a for the chart on a specified shelf 7a, the chart 4a cannot be fetched when it is needed again, because location search is carried out on a block by block basis.

(5) In such location search apparatus, therefore, it is always required that any chart, if taken out from its location, must be, after use, returned to the compartment 13a in which it was originally kept.

For these reasons, such known location-search apparatus leaves much yet to be desired for use in such searching operations for medical charts as illustrated above by way of example. True, no satisfactory search apparatus has been developed which can be reliably employed in the search of a particular object desired to be fetched.

SUMMARY OF THE INVENTION

This invention is directed to solving the foregoing problems, and accordingly it is a primary object of the invention to provide a novel discrete object searching apparatus which permits discrete fetching of desired objects, such as files, in a simple and speedy manner, whenever they are required, from among a large number of objects kept in storage.

To accomplish this object, the invention provides a discrete object searching apparatus comprising a signal transmitter which transmit a predetermined signal matching each individual object, such as file, and a signal receiver mounted to said object, said receiver having a data processing portion operable upon receipt of the signal from the transmitter, said object being equipped with an indicator.

In the discrete object searching apparatus according to the invention, each individual object, such as file, is provided with a receiver; therefore, when a signal bearing an ID number for a desired object is transmitted from a computer proper through the transmitter, the signal is received by receivers of individual objects, and in the data processing portion of each of the receivers the ID number of the signal received is compared with the ID number stored in the receiver. Only one particular object whose ID number coincides with the ID number of the signal received indicates externally its location through the indicator thereof which is, for example, a light-emitting diode.

Thus, only the particular object called by the computer proper can operate to indicate its location. According to the invention, therefore, individual objects can be easily located and discretely taken out.

Further, in the present invention, particular attention is directed to miniturizing the battery for the receiver mounted to each individual object, such as a file, economizing battery power consumption, and lengthening the service life of the battery, and to this end an infrared transmitter and an infrared receiver are employed for signal transmitting and receiving purposes; and a receptor portion of the infrared receiver is provided with a visible light cutting off means which transmits infrared light but cuts off visible light to prevent the data processing portion from operating upon reception of visible light.

One exemplary form of aforesaid visible light cutting off means is such that the receptor portion is coated with a paint.

In order to provide another means for battery power saving, the receptor portion and the data processing portion are directly connected to each other by omitting an amplifier portion for levelling up an optic signal received, and the infrared transmitter is disposed at a position that will enable the transmitter to transmit to the receptor portion such amount of infrared light as is necessary to actuate the data processing portion.

Thus, the receptor portion is unlikely to sense such visible light as fluorescent light, and if it happens to sense any such light, the level of optic signals is so low that the data processing portion will not be actuated if such signal is inputted to the data processing portion.

When infrared light is emitted from the transmitter at a command from the computer, the receptor portion senses the infrared light and accordingly the optic signal is inputted to the data processing portion so that current begins to flow in the data processing portion in which discrete object searching operation is properly carried out.

Therefore, any possible flow of current in the receiver due to the reception of any visible light, such as fluorescent light, is effectively prevented and, only when infrared light is sensed, current flows in the receiver.

Since no amplifier portion is provided, the apparatus of the invention eliminates current requirement for amplifying purposes.

The above described arrangement permits considerable battery power saving in the receiver and assures much prolonged service life of the battery.

It is another object of the invention to eliminate any meaningless battery power consumption in receivers of individual objects through not only such discrete management of objects as above noted, but also group management of the objects in conjunction with such discrete management.

It is a further object of the invention to provide a discrete object searching apparatus which enables easy storage management of objects by computer through two-way communication between the computer and the objects.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF PREFERRED EMBODIMENTS

Preferred embodiments of the invention will now be described with reference to the accompanying drawings.

Embodiment 1

Figure 1:
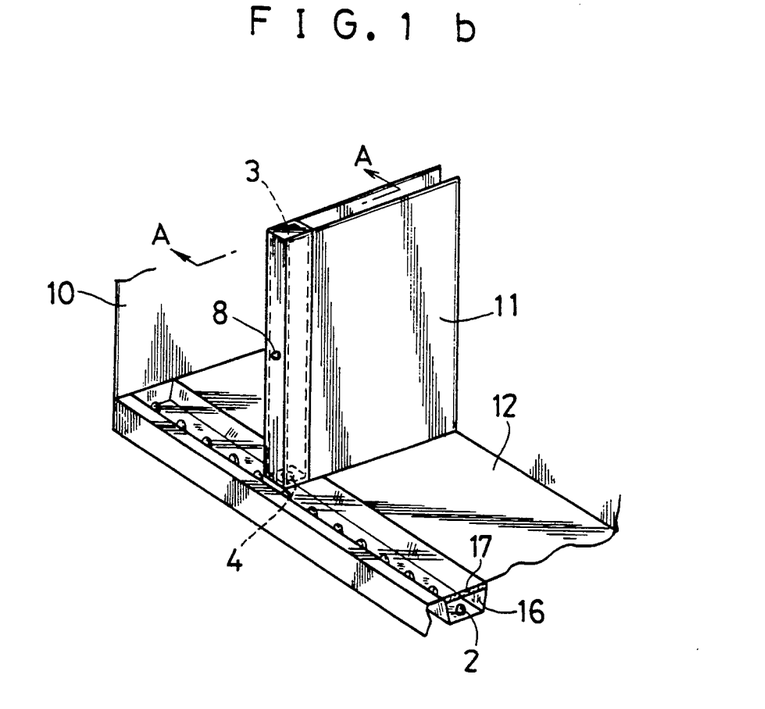
FIG. 1(a) is a perspective view showing a file searching apparatus.
FIG. 1(b) is a fragmentary enlarged view of the apparatus shown in FIG. 1(a)
FIG. 1(c) is a section taken on the line A—A in FIG. 1(b)
Figure 1A:
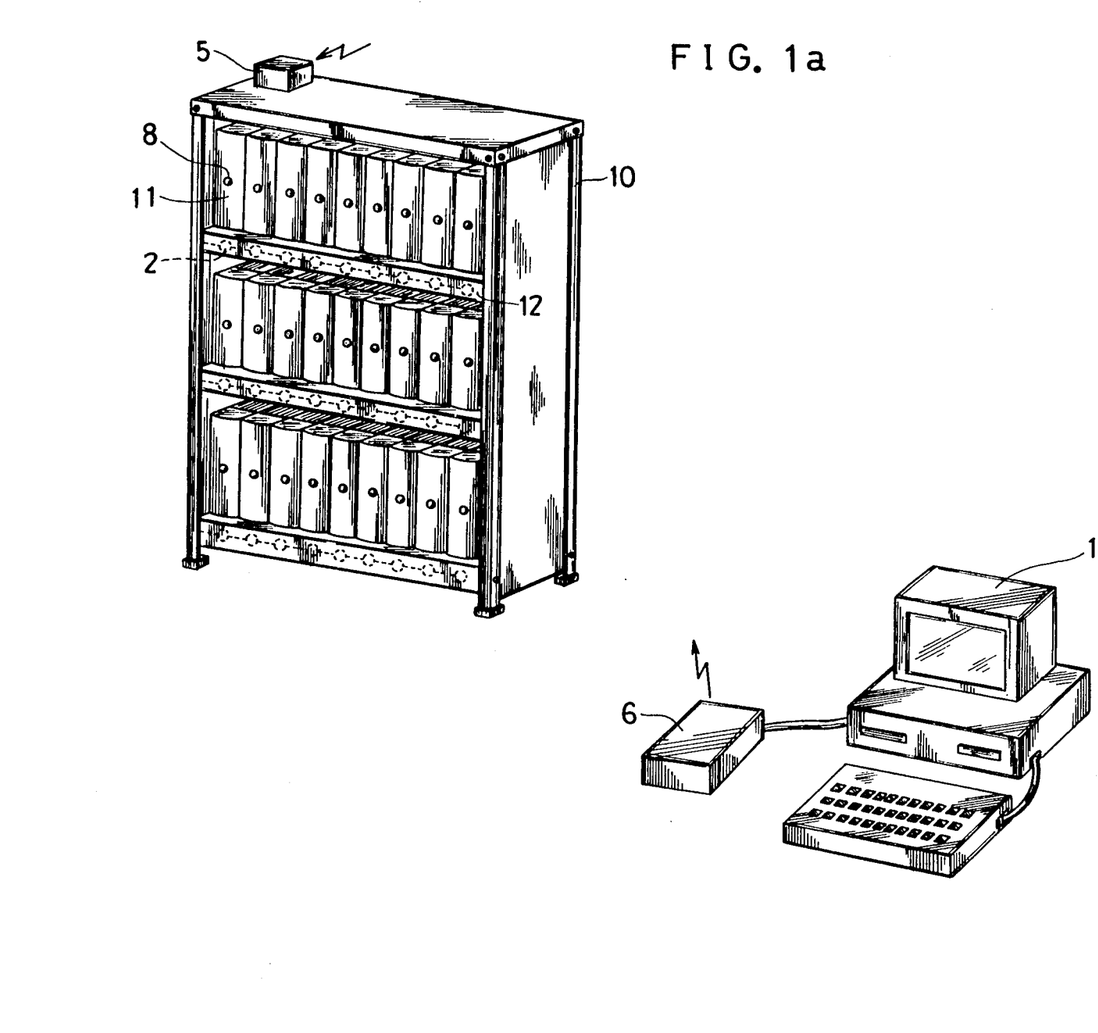

Referring to FIGS. 1(a) to 1(c), a computer 1 is provided for selecting a desired file to which is connected a transmitter 6 for transmitting predetermined signals to a repeater 5 mounted on the top of a file housing cabinet 10.

A multiplicity of infrared signal transmitters 2 (infrared light emitting diodes) disposed in grooves 16 of individual shelves 12 of the file housing cabinet 10 and at intervals of files are connected to the repeater 5. A transparent plastic plate 17 for protecting each infrared signal transmitter 2 is fitted in each of the grooves 16.

An infrared signal receiver 3 is mounted in a side portion 19 of each file 11. A receptor portion 4 of the infrared signal receiver 3 is mounted in a side bottom portion 18 of the file 11 at a distance of less than 5 cm from an adjacent one of the infrared signal transmitters 2. As FIG. 2 block diagram shows, at least one of infrared signal receivers 3 comprise a receptor portion 4 for sensing infrared light, a data processing portion 7 consisting of a CPU and a memory which is connected directly to the receptor portion 4 and which operates under supply of a current of several miliampere when it receives an optic signal of more than a certain level from the receptor portion 4, and a light emitting diode 8 as an indicator portion which lights in response to a signal from the data processing portion 7.

Figure 3:
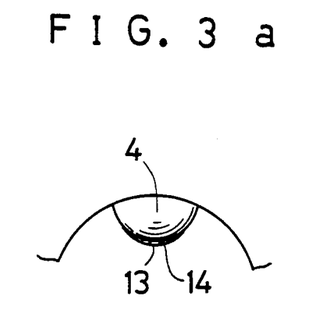
FIG. 3(a) is an explanatory view of a receptor portion coated with a red paint.
FIG. 3(b) is an explanatory view of a receptor portion covered with a filter.

Further, as FIG. 3(a) shows, an optic face 13 at the front end of the receptor portion 4 of the receiver 3 is coated with a red paint 14 that will not transmit visible light, which is taken as one example of visible light cutting off means.

The manner of operation and function of the above described embodiment will now be explained.

A desired file is first selected by the computer 1, and then a digital signal bearing an ID number for the file is transmitted from the signal transmitter 6 to the repeater 5 on the file housing cabinet 10. Upon receipt of the signal from the transmitter 6, the repeater 5 informs the multiplicity of infrared signal transmitters 2 connected to the repeater 5 that the signal is received. Subsequently, the infrared signal transmitters 2 transmit a digital signal in the form of an infrared signal which corresponds to the ID number of the file 11, and the infrared signal is received by the receivers 3 of individual files 11 housed in the cabinet 10.

In this case, it is the receptor portion 4 of each receiver 3 that senses the infrared light. The receptor portion 4 senses through the transparent plastic plate 17 the infrared light emitted from the infrared transmitter 2.

Figure 2:
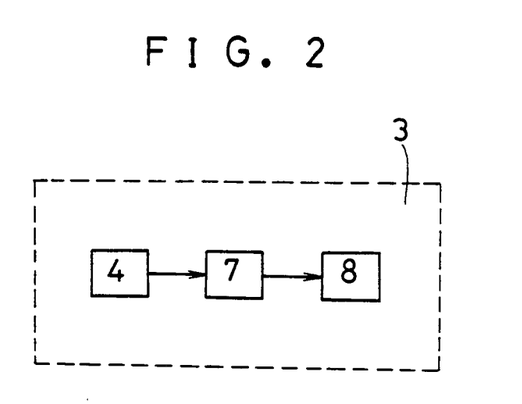
FIG. 2 is a block diagram showing a receiver.

When an optic signal of more than a certain level is inputted from the receptor portion 4 to the data processing portion 7, then the data processing portion 7 operates and current is supplied from a power supply to the data processing portion 7, whereupon a current of several miliampere begins to flow in the data processing portion 7 in which otherwise a current of only several microampere flows.

In the data processing portion 7 of each file 11, the infrared digital signal received is checked as to whether it coincides with the ID number of the file 11. If the signal is in agreement with the ID number, the indicator portion or light emitting diode 8 lights to externally inform of the location of the file so that the desired file can be readily taken out from among the multiplicity of files housed in the cabinet 10.

The receptor portion 4 of the receiver 3, which senses infrared light in this way, is generally comprised of an optic element, such as photodiode, and can sense visible light from a fluorescent lamp or the like, as well as infrared light.

According to the invention, however, the optic face 13 of the receptor portion 4 is coated with red paint 14 in order to minimize its visible light sensing power.

Therefore, even if visible light is sensed by the optic face 13 and thus an optic signal of such light is inputted to the data processing portion 7, the signal level of such optic signal is so low that the data processing portion 7 is not liable to be actuated thereby; as such, there is no possibility of current flow of several miliampere in the data processing portion 7.

The coat of red paint 14 on the optic face 13 functions as a visible light cut-off means, thereby preventing the data processing portion 7 from operating.

Furthermore, since the receptor portion 4 and the data processing portion 7 are directly connected to each other, with no amplifier portion present therebetween, any signal received by the receptor portion 4 is not liable to be amplified.

Therefore, the receptor portion 4 is required to receive directly from the transmitter 2 a necessary amount of infrared light for operating the data processing portion 7, but since the receptor portion 4 and the transmitter 2 are positioned in proximity relation to each other (at a distance of less than 5 cm), the receptor portion 4 can receive a desired amount of infrared light from the transmitter 2.

In the above described embodiment, the optic face 13 of the receptor portion 4 is coated with red paint, because it has been proved by experiments that red color can cut off visible light most effectively and transmit infrared light well, but alternatively a paint of other than red color may be coated on the optic face 13.

It has been proved that other colors, for example, green and black, can cut off visible light at higher rates than red color, but they are very much inferior in their ability to transmit infrared light, and that yellow color is almost comparable to red color in its ability to cut off visible light but is inferior to red color in infrared transmittance.

Coating material for cutting off visible light rays is not limited to paints, but other coating materials than paint may be used. Further, means for cutting off visible light is not limited to a coat applied to the optic face; alternatively, for example, it may be a covering 15, such as a filter, placed on the entirety of the receptor portion 4 as shown in FIG. 3(b).

What is important here is that some means for cutting off visible light is provided in the receptor portion 4 in order to prevent the data processing portion 7 from operating upon entry of visible light.

In the above described embodiment, the receptor portion 4 and the data processing portion 7 are directly connected to each other and signal transmitters 2 are disposed on the groove 16 of each shelf 14 in equispaced relation so that receptor portions 4 are individually spaced from transmitters 2 at a distance of less than 5 cm.

It has been proved by experiments that where each receiver 3 has no amplifier portion, a distance of less than 5 cm between its receptor portion 4 and the corresponding transmitter permits the receptor portion 4 to receive from the transmitter a necessary level of light for operating the data processing portion 7. Therefore, the site for individual transmitters 2 is not limited to the groove 16 of each shelf 14 as shown in the above described embodiment, but it is only required that each transmitter 2 is mounted at such a position as will permit it to transmit to the corresponding receptor portion 4 such amount of infrared light as is necessary to actuate the data processing portion 7.

Again, in the embodiment, receptor portion 4 is disposed in the groove 16 of the side bottom 18 of each file, but the site for the receptor 4 is not limited to the side bottom 18 of the file; it is only required that the receptor 4 is disposed at such a position as will permit it to receive such amount of infrared light as is necessary to actuate the data processing portion 7.

In the foregoing embodiment, files are taken up by way of example as objects for search, but objects for search are not limited to files; for example, they may be records, book covers, medical charts used in hospitals, container boxes, and the like. Whatever the objects may be, the only necessary condition is that they can be fitted with a receiver.

The transmitters and receivers need not be infrared transmitters and receivers; they may be of any kind provided that they can be used for discrete object searching.

The indicator portion is not limited to light emitting diode.

Embodiment 2

A second embodiment of the discrete object searching apparatus of the invention in which the location of a file housed in a cabinet is displayed on the display screen of a computer will be explained.

Figure 4:
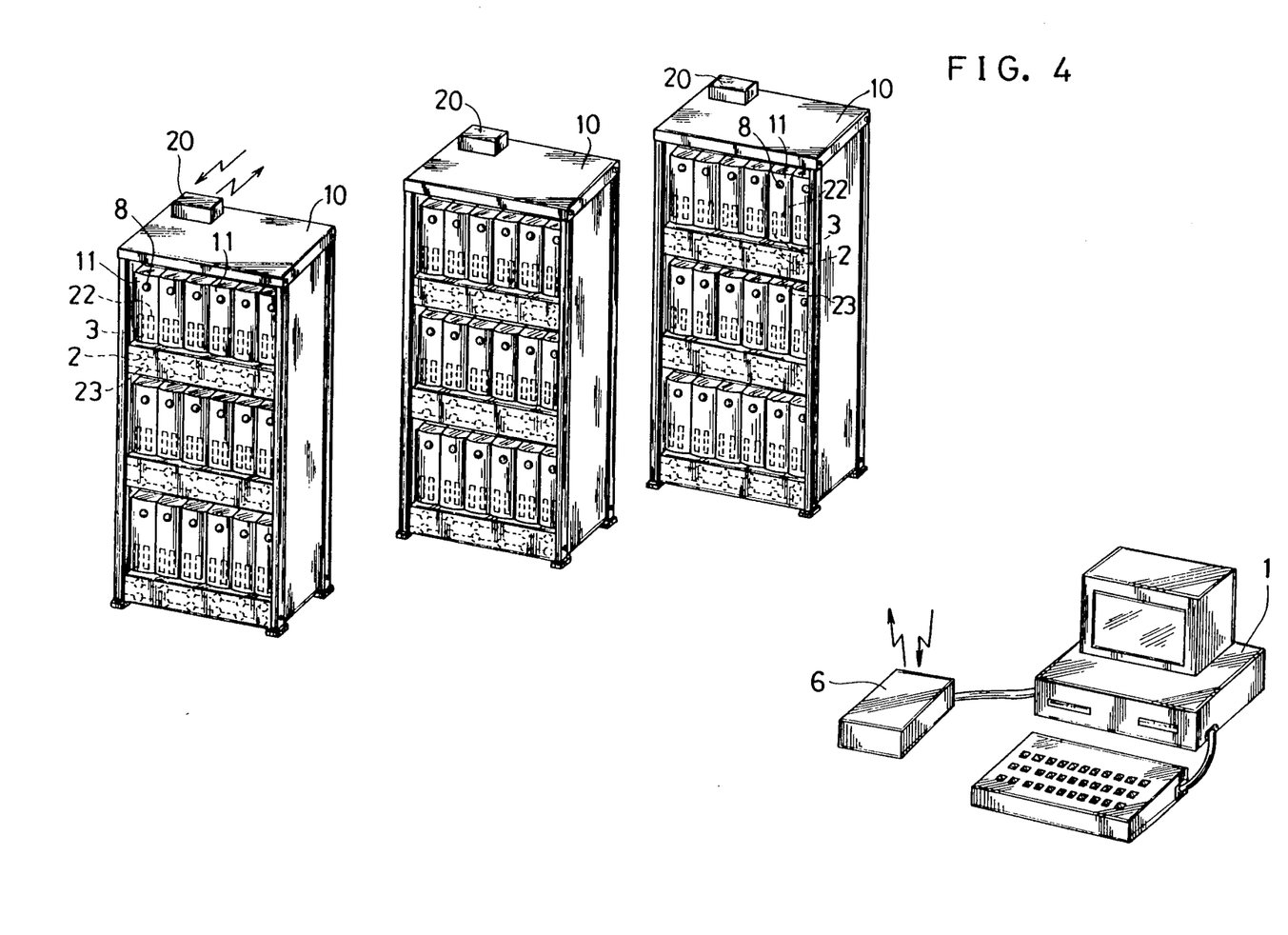
FIG. 4 is a perspective view of a file searching apparatus incorporating a two-way communication system.

In FIG. 4, a repeater 20 is provided which receives a signal from a transmitter-receiver 6 connected to a computer proper 1 and also transmits a signal to the computer proper 1. The repeater 20 is mounted on the top of a file housing cabinet 10.

A multiplicity of infrared transmitters 2 and a multiplicity of infrared receivers 23 are provided which are mounted to shelves 12 of each cabinet 10 connected to the repeater 20.

An infrared receiver 3 and an infrared transmitter 22 are provided which are disposed in a side portion of each file 11.

In this embodiment, each repeater 20 receives a digital signal having an ID number of a desired file as the signal is transmitted from the transmitter-receiver 6 connected to the computer 1, and the individual infrared transmitters 2 connected to the repeater 20 transmit the digital signal in the form of infrared light to individual infrared receivers 3 mounted to corresponding files. Each file 11, in its receptor portion 4, receives the infrared light and its data processing portion 7 checks to determine whether the digital signal received coincides with the ID number of the file. Only a file 11 having the same ID number as the ID number of the digital signal received causes a light emitting diode 8 therein to light up.

Subsequently, the file 11 whose light emitting diode 8 is lighted transmits an infrared signal to a multiplicity of infrared receivers 23 mounted to the shelf 12 below the file 11.

More particularly, if the file 11 whose light emitting diode lit is located on a second shelf of a first cabinet, only the infrared receivers 23 mounted to the second shelf 12 of the first cabinet receives the infrared signal and informs the repeater 20 of the receipt of the infrared signal.

Thus, the repeater 20 knows that the desired file is located on the second shelf of the cabinet.

The repeater 20 then transmits a digital signal consisting of the cabinet number and the shelf number to the transmitter-receiver 6 connected to the computer 1, which in turn displays the location of the desired file 11 indicating the cabinet number and the shelf number upon receipt of the digital signal.

Thus, it is possible to know the location of the desired file via the screen of the computer 1.

In the present embodiment, as above described, two-way communication is effected between the computer and a relevant file through the repeater 20 so that the location of the file can be made known through the display screen of the computer, which faciltates storage management and discrete management of files.

It is noted that in order to avoid interference of two kinds of infrared signals from the infrared transmitters 2 and 22 mounted respectively to each shelf 12 and each file 11, it is necessary that infrared waveforms and wavelengths for those infrared signals should be varied for differentiation.

Embodiment 3

A third embodiment or a discrete file searching apparatus which can perform group searching and discrete searching operations in combination with respect to files will be explained.

Figure 5:
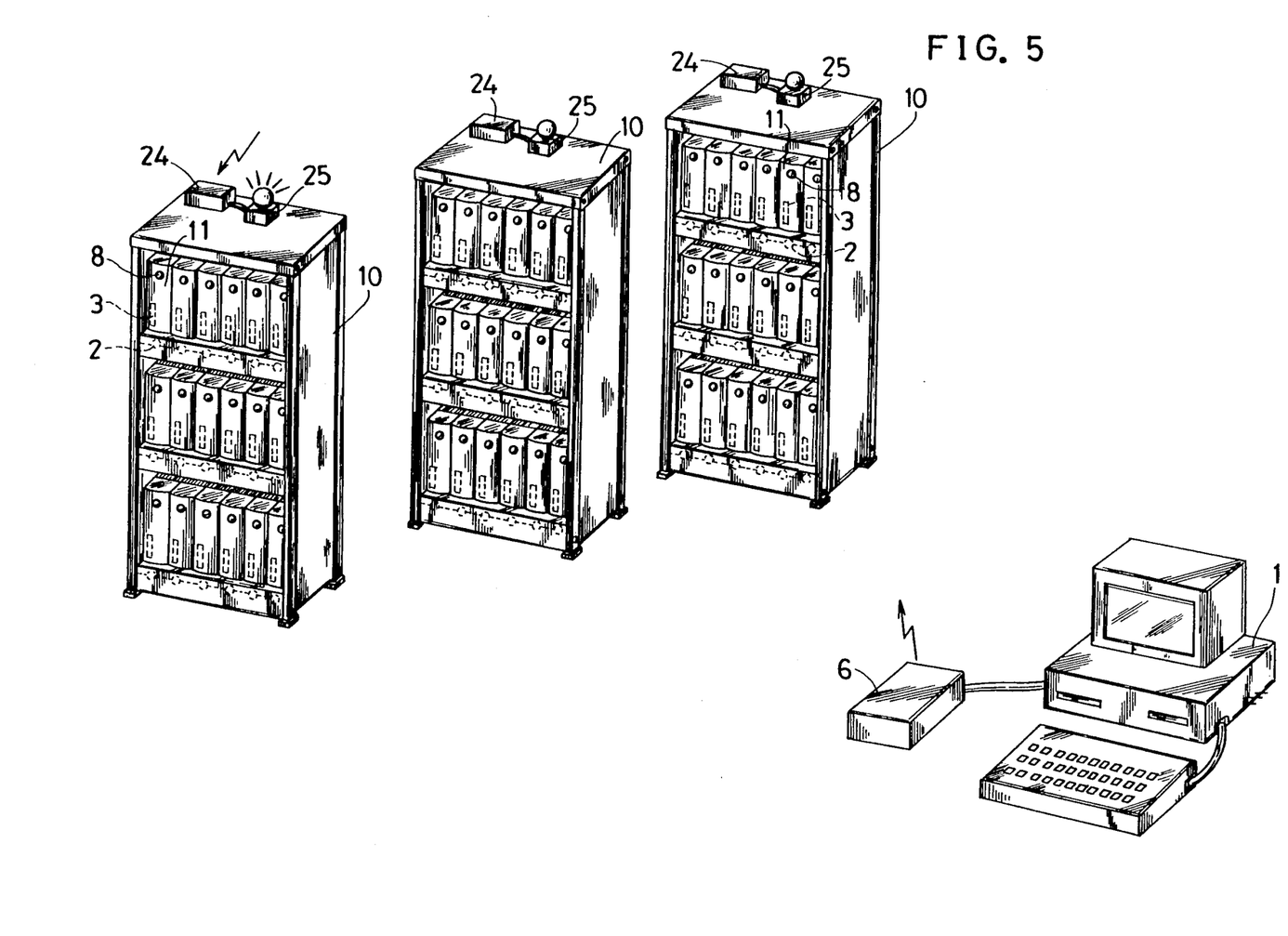
FIG. 5 is a perspective view of a file searching apparatus incorporating a group management system.

In FIG. 5, numeral 24 designates a repeater for receiving signals from a transmitter 6 connected to a computer 1, the repeater 24 being mounted on the top of each cabinet 10. A lighting lamp 25 connected to a relevant repeater 24 is mounted on the top of the cabinet 10.

A particular file 11 is first designated by the computer 1, and a digital signal bearing the ID number of the file is transmitted by the transmitter 6 connected to the computer 1, to the repeater 24 on each cabinet 10. Upon receipt of the signal, the repeater 24 checks the signal to determine whether a file having same ID number as that of the signal is present in the cabinet, and if its decision is that such file is present in the cabinet 10, it causes the lamp 25 connected to the repeater 24 to light up.

More particularly, it is assumed, for example, that files having ID numbers of 1 through 100 are housed in a first cabinet, files having ID numbers of 101 through 200 are housed in a second cabinet, and files having ID numbers of 201 through 300 are housed in a third cabinet, and that such information is already stored in the repeater 24 on each individual cabinet 10.

Then, if the computer proper 1 designates, for example, a file having the ID number of 10 and transmits a digital signal bearing the ID number to each repeater 24, the signal is received by individual repeaters 24, but only the lighting lamp 25 of the repeater 24 on the first cabinet lights up to inform externally that the cabinet 10 in which the particular file 11 is present is the first cabinet.

Subsequently, the infrared transmitters 2 mounted to the first cabinet 10 transmit the same digital signal to the files 11 housed in the first cabinet 10. Upon receipt of the digital signal, the receptor portion 3 of each of the files 11 checks the signal to determine whether the ID number of the digital signal coincides with the ID number of the file, and if the decision is that they coincide with each other, the lighting diode 8 lights up to externally indicate the location of the file 11.

According to this embodiment, as above described, files are divided into three groups and are housed group by group in three cabinets, each cabinet having a lighting lamp 25, so that a particular one of the cabinets 10 in which the desired file is present can be easily made known through lighting of the lamp 25.

In other words, prior to discrete file searching, group searching is carried out to determine a particular cabinet in which the desired file is housed, and then discrete searching is carried out by infrared transmitter 2.

Where such group searching is first carried out, it is unnecessary to actuate the receivers 3 of all the files housed in each cabinet 10 each time when searching is performed, and accordingly the receivers 3 of only the files 11 in the particular cabinet 10 in which the desired file is present are actuated.

By the above described arrangement it is possible to prevent meaningless current consumption through unnecessary actuation of receivers 3 and thus to economize battery power consumption with respect to individual files 11.

More particularly, where a large number of cabinets 10 are involved, the practice of group management according to this embodiment provides greater operation efficiency.

Embodiment 4

Next, a fourth embodiment or a discrete file searching apparatus in which partitioning members, such as book ends, for files are equipped with infrared receivers will be explained.

Figure 6:
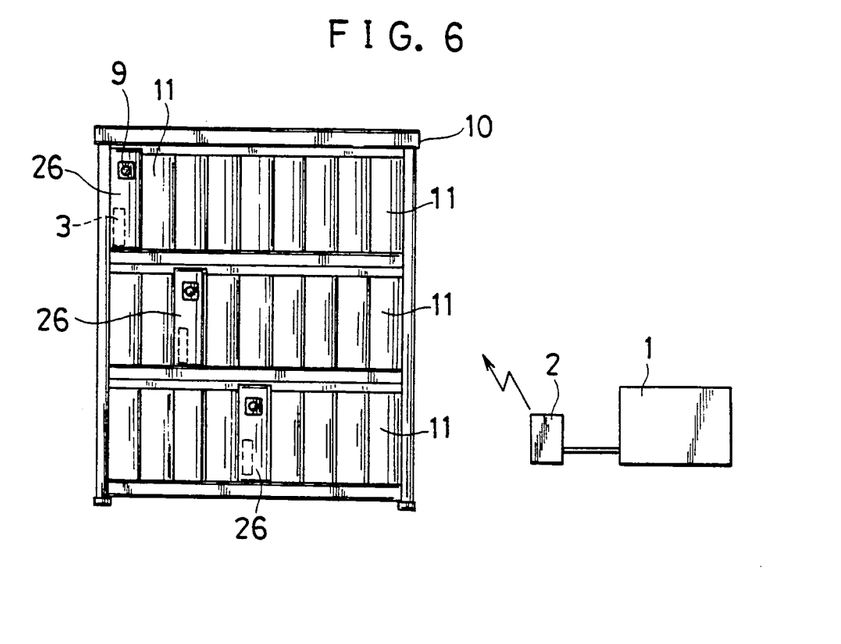
FIG. 6 is a front view showing a file searching apparatus in which a receiver is mounted to a book end.

Referring to FIG. 6, numerals 11 and 26 designate, respectively, files and book ends housed in a cabinet 10, individual files 11 being suitably partitioned by book ends 26.

Each book end 26 has an infrared receiver 3 disposed therein and further it is provided with a light emitting diode 9 which serves as an external indicator.

In operation, when a particular file 11 is designated by the computer 1, the infrared transmitter 2 connected to the computer 1 transmits a digital signal corresponding to the ID number of the particular file 11, the signal being then received by receivers 3 of the individual book ends 26.

When the receiver 3 of one of the book ends 26 determines that the digital signal received coincides with the ID number of one of the files 11 partitioned by the book end 26, it causes the light emitting diode 9 to externally indicate the book end 26 by which the desired file is partitioned. Thus, it is possible to know the location of the desired file 11 in the cabinet 10 using the book end 26 as a guide.

According to this embodiment, as above described, infrared receivers 3 are mounted to book ends 26 instead of individual files 11 and, therefore, from the standpoint of design, it is unnecessary to minimize the capacity of the battery mounted to each receiver 3 as in the case where the receiver 3 is attached to each file 11, with a resulting advantage that a larger capacity battery can be used to ensure longer service life of the battery.

The use of such large capacity battery for the receiver 3 makes it unnecessary to dispose the receiver 3 and the corresponding transmitter 2 in close proximity to each other, and provides the advantage that an existing cabinet can be used without an infrared transmitter 2 being mounted thereon.

Furthermore, each file need not be provided with a receiver and, accordingly, existing files can be used as such, cost saving being thus assured in many respects.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A discrete object search apparatus for searching and locating discrete objects comprising:

at least one cabinet having a plurality of shelves therein, each shelf having a groove defined therein with a transparent plate covering each of the grooves;

a plurality of infrared signal transmitters on each shelf for transmitting signals corresponding to the discrete objects being searched, each of the grooves having a plurality of said transmitters disposed therein along a longitudinal length thereof, adjacent transmitters being generally equidistantly spaced from one another, each of said discrete objects having a unique signal associated therewith;

infrared receivers individually mounted to each of the objects, each of said infrared receivers being associated with one separate, single one of said infrared transmitters, each of said infrared receivers having a receptor, a data processing portion and an external indicator, said receptor portion and said data processing portion being directly connected to each other without an amplifier portion therebetween and said data processing portion being operatively connected to the external indicator, said receptor portion receives infrared signals from the one infrared signal transmitter associated therewith, the infrared signals being transmitted from the infrared transmitter through a transparent plate covering the groove and to the receptor portion of the receiver, said data processing portion being actuated when the signal associated with the discrete object in which the infrared receiver is mounted is received, said external indicator thereafter being actuated to indicate correspondence between said signal transmitted by the infrared signal transmitters and said receivers to show a location of a desired one of the discrete objects, said infrared transmitters being located in a position to enable the infrared transmitters to transmit to the receptor portion a necessary amount of infrared light for actuating the data processing portion, and the receptor portion of each infrared receiver being in close proximity to the infrared signal transmitter associated therewith; and means for cutting off visible light to the receptor portion to thereby prevent actuation of the data processing portion by visible light, said means for cutting off visible light permitting infrared light to reach the receptor portion.

2. The discrete object searching apparatus for searching and locating discrete objects according to claim 1, wherein said means for cutting off visible light comprises a paint coat on an optic face of the receptor portion.

3. The discrete object searching apparatus for searching and locating discrete objects according to claim 2, wherein said paint is a red paint.

4. The discrete object searching apparatus for searching and locating discrete objects according to claim 1, wherein the object is selected from the group consisting of book ends, records and medical charts.

5. The discrete object searching apparatus for searching and locating discrete objects according to claim 1, further comprising a multiplicity of signal receivers for each of the shelves, and each of said files as objects for search further having transmitters for transmitting signals to the receivers mounted on the shelves.

6. The discrete object searching apparatus for searching and locating discrete objects according to claim 1, wherein the objects for search are present in a plurality of groups and further including group indicators for each of the groups.

7. The discrete object searching apparatus for searching and locating discrete objects according to claim 6, wherein the at least one cabinet is a plurality of cabinets and wherein said objects for search are files and a multiplicity of files are housed in the plurality of cabinets so that the files are present in groups in individual cabinets, each of the cabinets being equipped with one of the group indicators.

8. The discrete object searching apparatus for searching and locating objects according to claim 6, wherein said group indicator is an electric lamp.

9. The discrete object searching apparatus for searching and locating objects according to claim 7, wherein said group indicator is an electric lamp.

10. The discrete object searching apparatus for searching and locating discrete objects according to claim 1, wherein the external indicator is a light emitting diode.

11. The discrete object searching apparatus for searching and locating discrete objects according to claim 1, wherein each discrete object has one of said infrared signal transmitters positioned less than 5 cm from the receptor portion thereof.

12. The discrete object searching apparatus for searching and locating discrete objects according to claim 2, further comprising a multiplicity of signal receivers for each of the shelves, and each of said files as objects for search further having transmitters for transmitting signals to the receivers mounted on the shelves.

13. The discrete object searching apparatus for searching and locating discrete objects according to claim 3, further comprising a multiplicity of signal receivers for each of the shelves, and each of said files as objects for search further having transmitters for transmitting signals to the receivers mounted on the shelves.

14. The discrete object searching apparatus for searching and locating discrete objects according to claim 1, wherein the receptors of each of the infrared receivers are located on a bottom side of the object, the receptor being located above the associated infrared signal transmitter when the object is placed on one of the shelves of the at least one cabinet.

15. The discrete object searching apparatus for searching and locating discrete objects according to claim 14, wherein the receptor, data processing portion and external indicator of each of the infrared receivers are located on a front portion of the object.

* * * * *